Sept. 1, 1936.  J. A. KORENGOLD  2,053,086
NERVE TESTING DEVICE
Filed Feb. 15, 1933  2 Sheets-Sheet 1

Inventor
John A. Korengold
Benj. J. Rooth Atty.

Sept. 1, 1936.  J. A. KORENGOLD  2,053,086
NERVE TESTING DEVICE
Filed Feb. 15, 1933    2 Sheets-Sheet 2
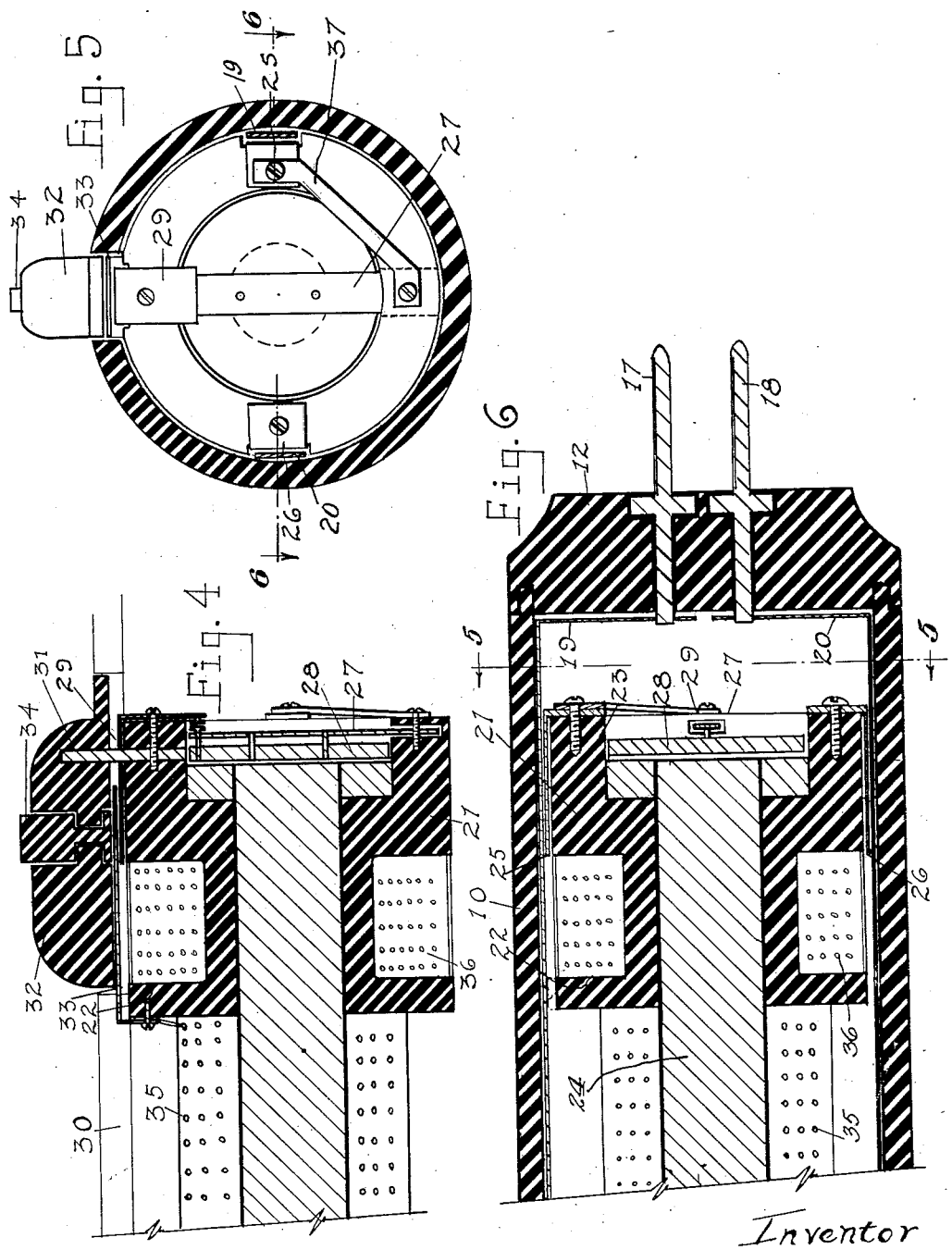
Inventor
John A. Korengold
Benj. T. Roodhouse
Atty.

Patented Sept. 1, 1936

2,053,086

UNITED STATES PATENT OFFICE 2,053,086

NERVE TESTING DEVICE

John A. Korengold, Chicago, Ill.

Application February 15, 1933, Serial No. 656,958

1 Claim. (Cl. 175—357)

My present invention relates to improvements in nerve testing devices.

I am aware that nerve testing devices have already been provided which comprise the provision of apparatus for subjecting the nerve or tissue under investigation to a current of electricity. Such means for nerve testing, so far as I am aware, heretofore has comprised, besides the apparatus for properly conducting the current, merely manually operated mechanism for closing and opening the electric circuit. Physiologically, the conscious or perceived stimulation of the nerve occurs principally, if not entirely, at the moment of the creation of the circuit so that the presence or sensitiveness of nerve life in a tissue may be more satisfactorily and safely disclosed by a relatively rapidly intermittent than by a continuous current. It has therefore been my object to produce a mechanism which will, besides securing hand or manual control of the circuit, also provide mechanical interruptions for the circuit as well.

I have had as a further object the provision of means to permit the control of the voltage and amount of such a testing current which further extends the sphere of use of my apparatus while at the same time avoiding the use of a dangerously strong current in such tests.

I have attained the foregoing objects by means of the mechanism illustrated in the accompanying drawings, in which—

Fig. 4 is a fragmental detail to an enlarged scale of the mechanical circuit interrupting mechanism.

Fig. 5 is an end view of the structure shown in Fig. 4; and

Fig. 6 is a fragmental section similar to that shown in Fig. 4 but on a plane at right angles thereto.

Similar reference characters refer to similar parts throughout the respective views.

Figure 1:
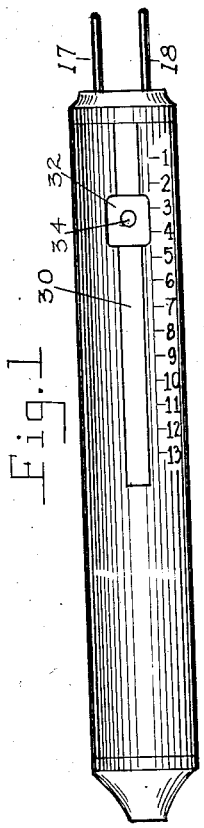
Fig. 1 is a longitudinal elevation of a casing in which my apparatus is installed.
Figure 2:
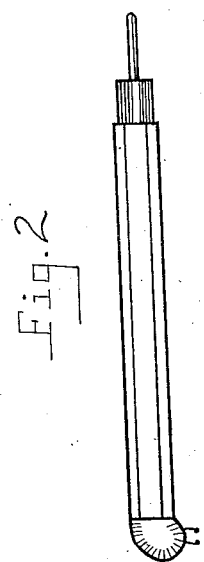
Fig. 2 illustrates a form of pulp tester for teeth shown in position for assembly with the structure shown in Fig. 1, but not assembled therewith.
Figure 3:
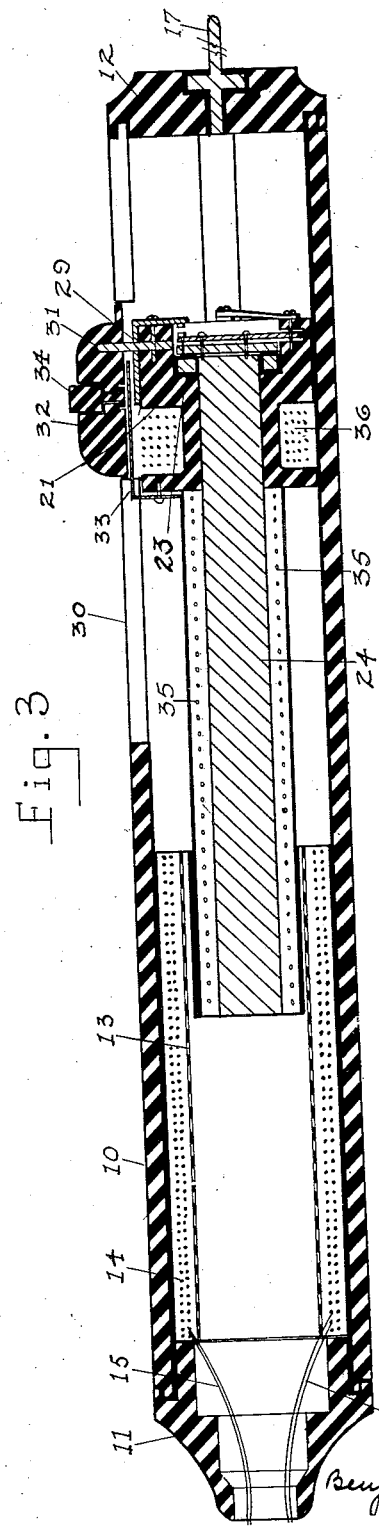
Fig. 3 is a central, longitudinal section to an enlarged scale through the casing shown in Fig. 1 in the plane transverse to the plane of the terminal connectors.

The apparatus comprises a cylindrical casing 10 closed by end plugs 11 and 12. The end plug 11 has secured thereto a hollow cylinder 13 of insulating material about which is wrapped a coil 14 forming the secondary winding of an induction coil. The ends of this coil 14 are connected with terminals 15 and 16 suitably disposed in the plug 11. Extending through the plug 12 are a pair of spaced terminal connecting posts 17 and 18 which are respectively secured to conductor bars 19 and 20 which lead forwardly against the sides of the casing 10, the forward ends whereof are secured to the plug 11 but are not in electrical connection with the coil 14 or the terminals 15 and 16 thereof.

Slidably mounted within the bore of the casing 10 is a spool 21 of insulating material having an annular channel 22 and a recess 23 in one end thereof. The center of the spool 21 is bored and fixedly mounted therein is a shaft or core 24 of magnetizable material, such as soft iron. The core 24 projects a short distance into the cavity 23 and extends sufficiently far from the opposite end of the spool 21 to permit it to be entered entirely within the secondary coil 14 heretofore mentioned. The spool 21 is longitudinally slotted at diametrically opposite locations to permit the passage of the conductor bars 19 and 20 and in these slots are secured spring pressed contact blades 25 and 26 for the purpose of contacting said bars. At a quarter of the circle from the location of the contact blades 25 and 26 is secured to the end of the spool a spring contact blade 27 extending nearly across the recess 23 in the end of the spool and secured to this spring contact blade 27 by pins, or in any other suitable way, is a metal disc 28 which the contact blade serves to hold yieldingly opposite the end of the core 24.

A contact strip 29 is mounted on the side and end of the spool 21 opposite to the point of mounting the contact blade 27 and so as to project over the recess 23 and over the free end of the blade 27. Opposite the location of the strip 29 the casing 10 is longitudinally slotted, as at 30, and pinned by the pin 31 to the spool 21 so as to slide in the slot 30 is a slide block 32. Secured to the opposite face of the spool 21 is a contact blade 33 which extends over the contact strip 29 and between the contact strip 29 and the slide block 32. In the slide block 32 is mounted a press button 34 directly over the blade 33 so that by depressing the button 34 contact is established between the blade 33 and contact strip 29.

A primary winding 35 for co-operation with the secondary winding 14 is disposed about the inwardly extending end of the core 24. Also a special magnetizing winding 36 is disposed in the annular slot 22 of the spool. The circuit runs as follows:

A strap, or other suitable conductor 37, connects contact 25 with blade 27. Current runs through blade 27 and, when button 34 is depressed, through strip 29 and blade 33 to one end of coil 35. The other end of coil 35 is connected with one end of coil 36. The opposite end of coil 36 is connected with contact 26. Upon the completion of this circuit by pressing button 34, core 24 is magnetized and attracts disc 28, which breaks contact between blade 27 and strip 29. Blade 27, however, being of spring metal, mechanically restores the circuit while button 34 is depressed and causes a succession of current pulsations through primary coil 35 which induces currents in secondary coil 14.

When slide block 32 is in position so that primary coil 35 is entirely within secondary coil 14 a maximum of current is induced in secondary winding 14, but as slide block 32 is moved to withdraw primary coil 35 from secondary coil 14 the volume of current is reduced, whereby I have secured a relatively rapidly pulsating test current, the volume of which I may decrease for the purpose of ascertaining whether a physiological reaction may be obtained.

Having described my invention what I claim as new and desire to secure by Letters Patent is:

In current controlling devices a cylindrical casing, conductors mounted interiorly and longitudinally thereof, a spool slidably mounted within the bore of said casing and having contacts with said conductor bars, a magnetizable element mounted centrally of and extending from said spool, a primary winding of an induction coil mounted upon the extending portion of said magnetizable element, a magnetizing coil in series with said primary coil mounted upon said spool, make and break mechanism mounted in the end of said spool, a secondary winding of an induction coil fixedly mounted within said casing so as to permit the reception and withdrawal of said primary winding, said casing being longitudinally slotted, a slide block mounted in said slot and pinned to said spool, a press button mounted within said slide block and a spring contact co-operating with said press button for controlling the circuit between the primary induction coil and the make and break mechanism, and parallel spaced contact points associated with the respective ends of the secondary coil of said induction coil extending from said cylindrical casing.

JOHN A. KORENGOLD.